(12) United States Patent
Khoshkava (10) Patent No.: US 10,180,725 B2
(45) Date of Patent: Jan. 15, 2019

(54) BILAYER HAPTIC FEEDBACK ACTUATOR

(71) Applicant: IMMERSION CORPORATION, San Jose, CA (US)

(72) Inventor: Vahid Khoshkava, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 99 days.

(21) Appl. No.: 15/239,955

(22) Filed: Aug. 18, 2016

(65) Prior Publication Data

US 2017/0060243 A1 Mar. 2, 2017

Related U.S. Application Data

(60) Provisional application No. 62/209,820, filed on Aug. 25, 2015.

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
CPC ............................... G06F 3/016; G06F 3/0416
See application file for complete search history.

(56) References Cited

U.S. PATENT DOCUMENTS

2006/0131733 A1* 6/2006 Mongia .................. G06F 1/20
257/706

OTHER PUBLICATIONS

Roman Vitushinsky et al.: "Bistable Thin-Film Shape Memory Actuators for Applications in Tactile Displays," Journal of Microelectromechanical Systems, IEEE Service Center, US, vol. 18, No. 1, Feb. 1, 2009 (Feb. 1, 2009), pp. 186-194, XP011240897, ISSN: 1057-7157, DOI: 10.1109/JMEMS.2008.2009816.*
S. Boisseau et al.: "Semi-flexible Bimetal-based Thermal Energy Harvesters," Smart Mater. Struct., vol. 22, 2013, p. 025021, XP02765750.*
Vitushinsky et al., "Bistable Thin-Film Shape Memory Actuators for Applications in Tactile Displays," Journal of Microelectromechanical Systems, 18:186-194 (2009).
Sehr et al., "Time constant and lateral resonances of thermal vertical bimorph actuators," J. Micromech. Microeng. 12:410-413 (2002).
Boisseau et al., "Semi-flexible bimetal-based thermal energy harvesters," Smart Mater. Struct. 22:025021(8 pages) (2013).
Arnaud et al., "Piezoelectric and electrostatic bimetal-based thermal energy harvesters," Journal of Physics: Conference Series 476:012062(5 pages) (2013).
Cimalla et al., "Group III nitride and SiC based MEMS and NEMS: materials properties, technology and applications," J. Phys. D: Appl. Phys. 40:6386-6434 (2007).
Sehr et al., Fabrication and test of thermal vertical bimorph actuators for movement in the wafer plane, J. Micromech. Microeng. 11:306-310 (2001).

* cited by examiner

*Primary Examiner* — Lisa Landis
(74) *Attorney, Agent, or Firm* — Medler Ferro Woodhouse & Mills PLLC (57) ABSTRACT

The present application relates generally to haptic feedback actuators and their construction and use in touch based systems. The haptic feedback actuators are suitably bilayer structures including at least two materials having different thermal coefficients, allowing the structure to deflect from a first position to a second position in response to heating and/or cooling of the structure.

13 Claims, 10 Drawing Sheets

BILAYER HAPTIC FEEDBACK ACTUATOR

CROSS-REFERENCE TO RELATED APPLICATIONS

The present application claims benefit of U.S. Provisional Patent Application No. 62/209,820, entitled "Ultrathin Bilayer Haptic Feedback Signal Generating Actuator," filed Aug. 25, 2015, the disclosure of which is incorporated by reference herein in its entirety.

FIELD OF THE INVENTION

The present application relates generally to haptic feedback actuators and their construction and use in touch based systems. The haptic feedback actuators are suitably bilayer structures including at least two materials having different thermal coefficients, allowing the structure to deflect from a first position to a second position in response to heating and/or cooling of the structure.

BACKGROUND

Haptic effects are used to enhance the interaction of an individual with an electronic device. Haptic effects enable the user to experience a touch sensation, which is typically generated by an actuator embedded in the device. Such a haptic effect actuator provides acknowledgement or feedback of a user's interaction with the electronic device, alternatively, or in addition to, visual and/or audio effects via a display or audio device. There continues to be a need for providing such feedback via non-visible user interfaces in a wide variety of sizes of devices. The size and power consumption of such haptic effect actuators become more important as an increasing number of electronic devices with user interfaces require efficient power consumption. There remains a need in the art for haptic effect actuators that have a low profile, such as by being thin or compact, and that consume less power.

SUMMARY

In view of the foregoing, provided herein are systems and methods for providing haptic feedback to a user, particularly via a device having a haptic feedback generator.

In embodiments, provided herein are systems for providing haptic feedback to a user. The systems suitably include a device having a haptic feedback generator, wherein the haptic feedback generator includes a bilayer material strip. In embodiments, in response to a change in temperature, the bilayer material strip is configured to deflect between a first position and a second position to provide haptic feedback to the user.

Also provided herein are methods of generating haptic feedback in a haptic feedback generator system in response to a user's contact with the haptic feedback generator system. In embodiments, the methods include increasing the temperature of a first thermal energy source/sink in the haptic feedback generator system, thereby increasing the temperature of a bilayer material strip in the system, and deflecting the bilayer material strip between a first position and a second position to generate haptic feedback to the user.

BRIEF DESCRIPTION OF THE DRAWINGS

The foregoing and other features and aspects of the present technology can be better understood from the following description of embodiments thereof and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

In embodiments, provided herein are systems for providing haptic feedback to a user. As shown illustratively in FIGS. 1A and 1B, a system 100 suitably includes a device 104 having a haptic feedback generator 106A, which in embodiments, is also described herein as a user touchable haptic signal generator.

As used herein "haptic feedback" refers to information such as vibration, texture, and/or heat, etc., that are transferred, via the sense of touch, from a system as described herein to a user. Haptic feedback can also be described as a haptic feedback signal in embodiments herein.

Examples of device 104 which can include haptic feedback generator 106A include various wearables, mobile phones and tablets, touchpads, keyboards, gaming consoles and controllers, etc.

Figure 1A:
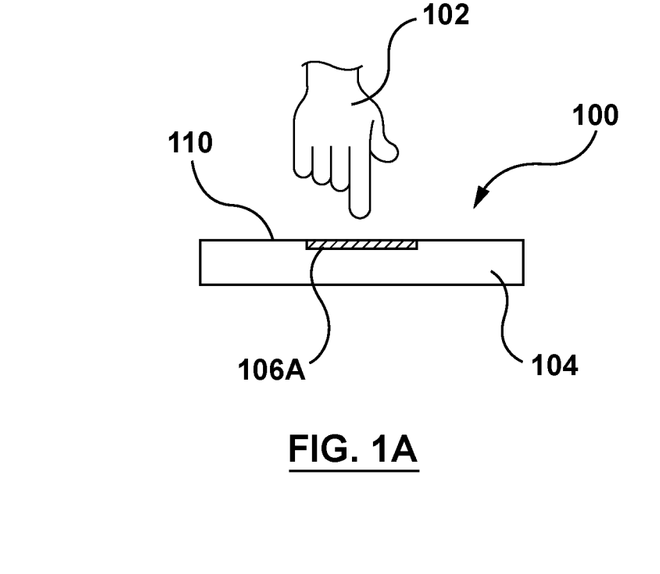
FIGS. 1A-1B are sectional views of a system for providing haptic feedback to a user in accordance with an embodiment hereof.
Figure 1B:
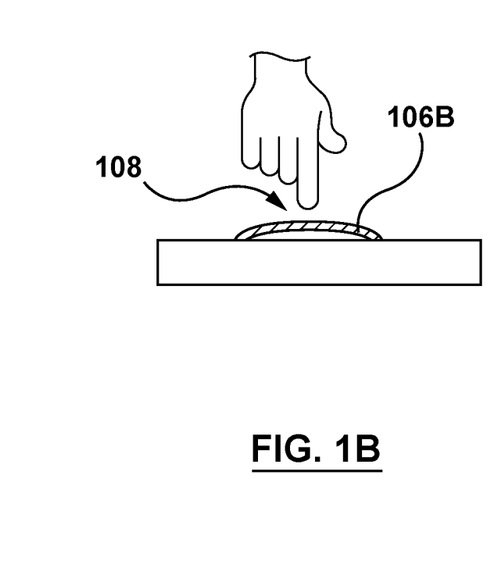

In embodiments, a user 102 interacts with device 104. In response to the interaction, haptic feedback generator 106A deforms or deflects to deflected haptic feedback generator 106B (also described as deflected haptic signal generator in embodiments herein) by rising toward user 102 to thereby create haptic feedback 108 (e.g., pressure, touch or vibration) from haptic feedback generator 106A. While user interaction suitably includes touching the surface of device 104, e.g., a substrate 110 of device 104 (such as a touchpad surface, touch screen, glass or plastic cover, etc.), in additional embodiments, the interaction can include directly touching haptic feedback generator 106A. The user interaction can also comprise the user coming sufficiently close enough to the haptic feedback generator to initiate the deflection without actually touching the haptic feedback generator.

In embodiments, haptic feedback generator 106A includes a bilayer material strip 202 (see FIGS. 2A-2B) for generating or providing a haptic feedback force that may be felt by a user. The generated haptic feedback provided by actuation of the bilayer material strip is of a sufficient force so as to not be inhibited or blocked by a user's normal contact pressure that the user may apply against a touch surface or touchable user interface, including haptic feedback generator 106A and substrate 110. That is, the haptic feedback force is sufficiently strong such that user 102 will be able to feel the deflection of bilayer material strip 202 upward against the touch of the user. Methods for increasing the haptic feedback force are described herein and include the use of adding materials, such as further layers or additional mass, to bilayer material strip 202 to increase its thickness or overall weight.

Figures 2A, 2B:
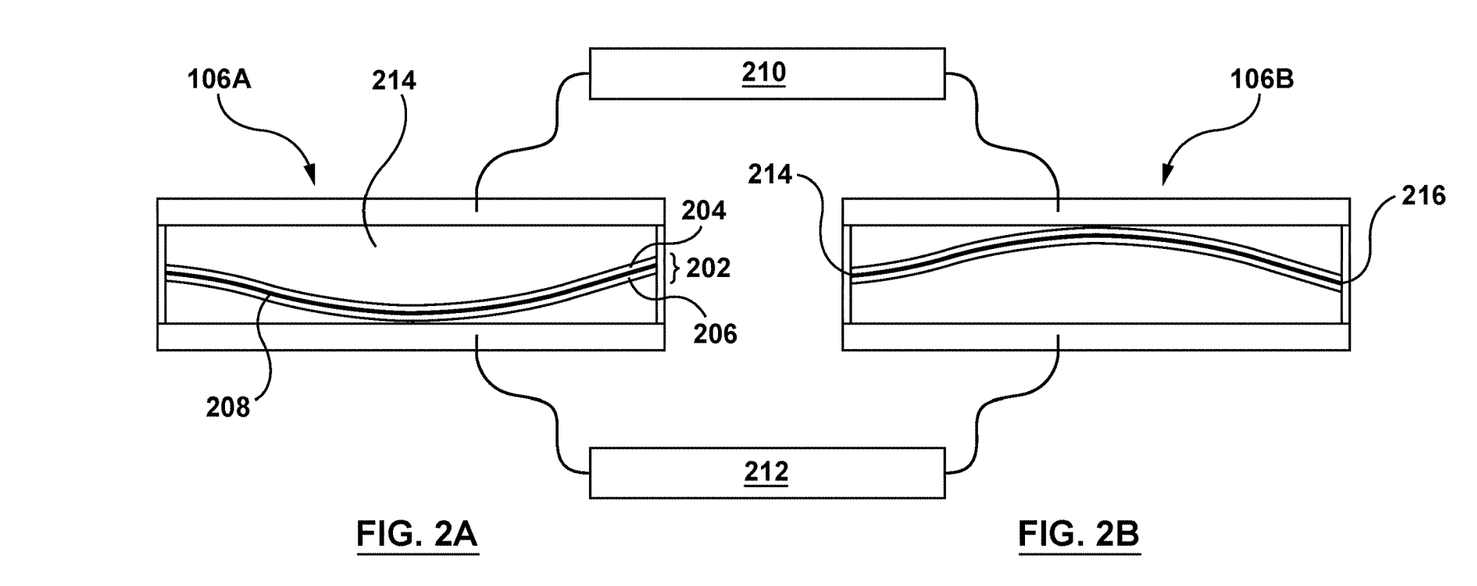
FIGS. 2A-2C are sectional views of a haptic feedback generator in accordance with an embodiment hereof.

FIGS. 2A and 2B are sectional views of exemplary haptic feedback generator 106A and deflected haptic feedback generator 106B, which are housed within or supported by device 104. As described herein, in embodiments, haptic feedback generator 106A is a touchable feedback generator, though direct touching is not required to initiate the haptic feedback as described herein.

Haptic feedback generator 106A suitably includes bilayer material strip 202 coupled to a substrate 110 or device 104, for example, at opposing ends 214 and 216 of the bilayer material strip 202, as shown in FIG. 2B. In embodiments, bilayer material strip 202 can be attached at opposing ends 214 and 216 using, for example, various adhesives or glues, rubber attachment points, or mechanical pivots, hinges, or other connection elements that allow the bilayer material strip to pivot or deflect between the first position and the second position, including allowing for oscillation and vibration, without becoming detached from haptic feedback generator 106A.

Upon user contact with the haptic feedback generator 106A (or substrate 110), a process is initiated which causes bilayer material strip 202 to deflect from a first position (FIG. 2A), in which the bilayer material strip has a substantially concave profile, protruding away from the user, to a second position (FIG. 2B), in which the bilayer material strip has a substantially convex profile, protruding toward the user, to provide the haptic feedback 108 to user 102. Haptic feedback 108 confirms the user contact (or sufficiently close interaction) with haptic feedback generator 106A. As shown in FIG. 2B, the haptic feedback generator 106A deflects (i.e., deforms or "snaps") to deflected haptic feedback generator 106B.

In embodiments, bilayer material strip 202 includes a first layer 204 and a second layer 206. First layer 204 and second layer 206 are suitably two strip-shaped (or layered) materials which are associated, bonded or otherwise adhered to one another all along a common boundary 208 between first layer 204 and second layer 206. Strip-shaped denotes that first layer 204 and second layer 206, and thus bilayer material strip 202, has a structure in which the length of the structure is longer than it is wide, and that has a thickness that is smaller than its width.

In additional embodiments, bilayer material strip 202 can include multiple layers which result in a structure displaying substantially similar mechanical characteristics of bilayer material strip 202, in that a multi-layer structure deflects from the first position to the second position in response to a change in temperature, as described herein. For example, a multi-layer structure can include three, four, five, six, seven, eight, nine, ten, etc., layers, to ultimately form bilayer material strip 202. A multi-layer structure can be bound or adhered together to result in a structure similar to that of bilayer material strip 202, with essentially two distinct sections (each of which is made up of multiple layers) of the strip that have different material properties, as described herein.

In embodiments, first layer 204 includes a first material, and second layer 206 includes a second material that is different from the first material. In embodiments, the first and second materials are metallic materials as described herein, resulting in a bimetal strip. As described herein, the first material and the second material may be selected so as to have different coefficients of thermal expansion (CTE). For example, the first material of first layer 204 in embodiments can have a higher CTE than the second material of second layer 206. For example, in embodiments, the first material may be copper and the second material may be iron. Exemplary materials and structures for use in bilayer material strip 202, including bimetals, are described for example in S. Boisseau, et al., *Semi-flexible Bimetal-based Thermal Energy Harvesters, Smart Mater. Struct.* 22 (2013) 025021 (8pp), the disclosure of which is hereby incorporated by reference herein in its entirety.

In embodiments, first layer 204 can have a higher CTE than second layer 206. Upon heating, first layer 204 expands more rapidly than second layer 206, causing a stress, which can be a torque or other force, to be generated in the bilayer material 202 which subsequently causes bilayer material 202 to deflect from the first position to the second position in a "snapping" motion. In embodiments, the layers which make up bilayer material strip 202 are bonded together and processed in a way that establishes a particular pre-set, shape set, or shape memory configuration for bilayer material strip 202. For example, the materials can be processed to be formed into a curved shape (i.e., the convex shape of FIG. 2A), or the materials can be processed to be formed, such as by being stamped, into a V-shape, providing the initial or shape set/memory configuration of the bilayer material strip, prior to the changes in temperature that are described herein. For example, setting in the curved shape or a V-shape configuration may be accomplished via stamping (e.g., using a mechanical die or stamp to form a bilayer material strip into a curve or a V-shape).

By heating bilayer material strip 202, the material layers (2 or more as described herein) increase in temperature. The different coefficients of thermal expansion (CTE) of the different materials in bilayer material strip 202 cause differential forces between the two layers of the bilayer material strip 202 to increase. During heating, coupling moments occur at the fixed ends of bilayer material strip 202 (i.e., 214 and 216 in FIG. 2B). The high lateral forces result from the different rates of thermal expansion due to the differences in the coefficients of thermal expansion of the materials which make up the strip. At a critical point where the magnitude of the couples overcome the curvature in the bilayer material strip, causing it to snap or deform. When the strip cools, the differential forces or stresses in bilayer material strip 202 dissipate or relax, and contraction causes a reversing of the previous stress build up and returns the strip to its original shape-set curvature, or V-shape, or other configuration. See Timoshenko, S., "Analysis of Bi-Metal Thermostats," *Journal of the Optical Society of America* 11:233-255 (1925) (the disclosure of which is incorporated by reference herein in its entirety) for a further description of the physics involved in the movement of bilayer material strip 202 in response to heating and cooling.

The CTE difference between the materials of bilayer material strip 202 enables bilayer material strip 202 to bend when heated up or cooled down, thereby causing a mechanical movement or deflection. In one example, where bilayer material strip 202 is curved (as shown in FIG. 2A), or V-shaped, in an initial state, bilayer material strip 202 can deform or deflect from the first position in FIG. 2A to the second position in FIG. 2B upon heating, and then deform or deflect back to the first position of FIG. 2A upon cooling.

Figure 3:
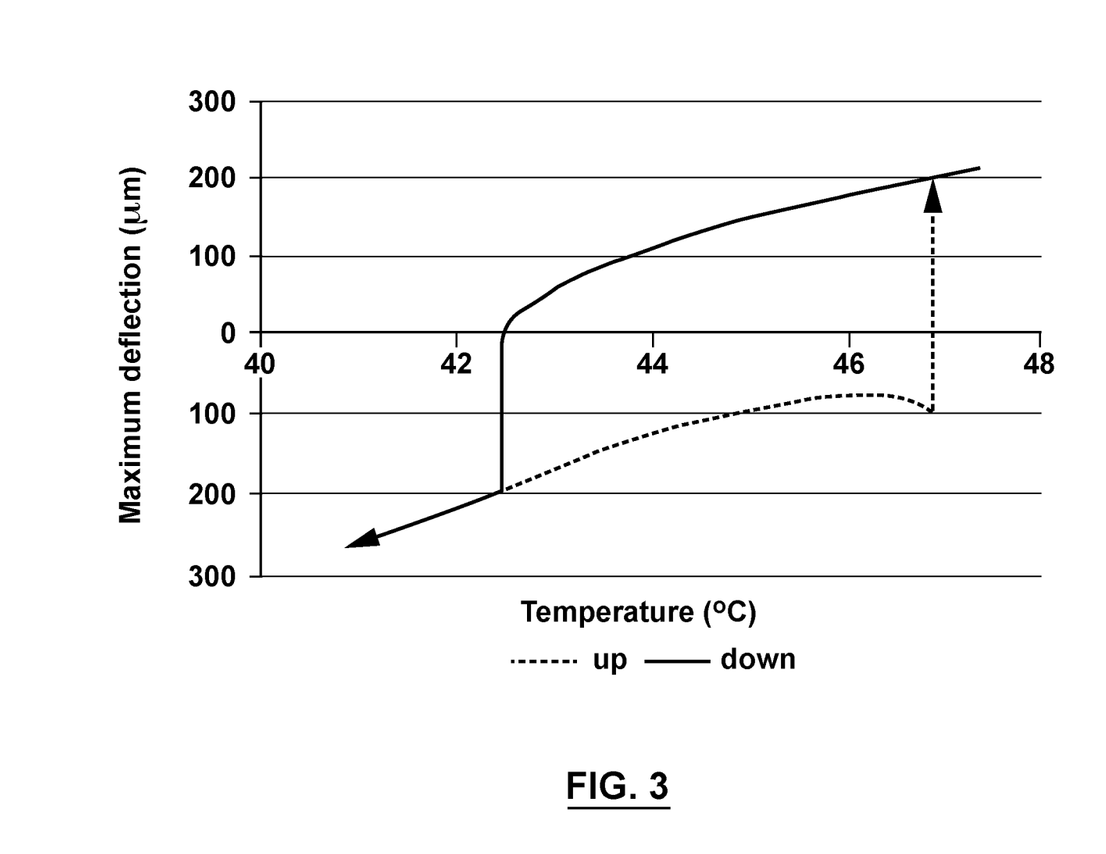
FIG. 3 is a graph illustrating deflection versus temperature of a bimetallic strip in accordance with an embodiment hereof.

FIG. 3 shows a hysteresis cycle for an exemplary bilayer material strip 202 (suitably a bimetallic strip) for use in embodiments described herein. FIG. 3 illustrates the deflection over a temperature range of about 42° C. to about 48° C., showing maximum deflection in microns. FIG. 3 demonstrates that as the temperature of the bilayer material strip rises (dotted line in FIG. 3), the strip reaches a "snap activation temperature" (about 47° C. in FIG. 3), where the strip undergoes a rapid deflection without a further detectable temperature rise. At this temperature, the bilayer material strip 202 deflects or "snaps" from a lower thermal energy source/sink, i.e., lower or bottom hot source, to be in contact with an upper thermal energy source/sink, i.e., upper or top cold source, as described below. Upon transfer of heat from the bilayer material strip 202 to a thermal energy source/sink, which results in a cooling of the strip, the temperature of the bilayer material strip decreases until it reaches an inflection temperature of approximately 42.5° C. (see solid line in FIG. 3). Upon reaching this inflection temperature, the material deflects or snaps from being in contact with the upper cold source, to being again in contact with the lower hot source.

In embodiments, a displacement of bilayer material strip 202 that results from its deflection will be on the order of 100's of microns to several millimeters. This displacement or deflection is measured from an initial position of the strip (e.g., the concave configuration of FIG. 2A) to a deflected position of the strip (e.g., the convex configuration, toward the user, in FIG. 2B). In further embodiments, the displacement of the bilayer material strip caused by the deflection is about 0.1 mm to about 5 mm, about 0.1 mm to about 2 mm, about 0.1 mm to about 1 mm, or about 0.1-0.5 mm, so as to provide various haptic feedback effects to a user. Such a displacement may take place only a single time for each interaction by a user, i.e., a single deflection or deformation for each time the user interacts with the system, or may take place several or a plurality of times for each interaction by a user.

In other embodiments as noted above, the displacement can be on the order of 10's of microns to 100's of microns, but occurring with a frequency of more than once per user interaction, i.e., multiple or a plurality of deflections or deformations each time the user interacts with the system, resulting in an oscillation or vibration. In embodiments where an oscillation occurs, the frequency of oscillation of bilayer material strip 202 can be on the order of 1 Hz to about 1000 Hz, and suitably about 1 Hz to about 100 Hz, or the order of 10-100 Hz, 10-50 Hz, or about 10-20 Hz.

In order to quickly deform and return to an initial or original state or configuration in response to a change in temperature, including both heating and cooling, bilayer material strip 202 is suitably of minimal thickness so as to maintain structural integrity while also allowing for haptic feedback. The use of a thin bilayer material strip allows for rapid heating and cooling, and thus rapid deflection or snapping. Suitably, by "thin" it is meant herein that a thickness of bilayer material strip 202 is on the order of about 1 µm to about 1 mm, about 1 µm to about 500 µm, more suitably about 1 µm to about 400 µm, about 1 µm to about 300 µm, about 10 µm to about 300 µm, about 50 µm to about 300 µm, about 50 µm to about 200 µm, about 50 µm to about 150 µm, about 50 µm to about 100 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, or about 200 µm.

It should be noted that the shape and geometry of bilayer material strip 202 is not limited to only rectangular or regular-shaped elements, but can have any geometry desired by the application or user, including various disk-shapes, circular-shapes, oblong-shapes, irregular-shapes, or other suitable geometries. The dimensions (i.e., length, width, diameter, circumference, etc.) of bilayer material strip 202 can also be dependent upon the final application, but will generally be on the order of millimeters to centimeters to 10's of centimeters.

As described herein, the process, impetus or change of condition/circumstance, that causes bilayer material strip 202 to deflect from the first position (FIG. 2A) to the second position (FIG. 2B) to provide haptic feedback 108 to user 102 (and thus confirming contact or near contact) is a change in temperature or also described herein as a thermal process. As used herein a "thermal process" refers to a process whereby heat is transferred to and/or from bilayer material strip 202, resulting in a change in temperature of the bilayer material strip and a deflection of the strip.

As shown in FIG. 2A, for example, at an equilibrium temperature (e.g., at room temperature (about 20-25° C.) (or whatever the normal operating temperature of system 100 may be), bilayer material strip 202 is in a convex configuration (i.e., curved away from user 102) and toward a thermal energy source/sink 212. In embodiments, first layer 204 of the strip has a higher CTE and is disposed above second layer 206 having a lower CTE. In this configuration, bilayer material strip 202 is in a first position (or a downward state) and bilayer material strip 202 can be in contact with thermal energy source/sink 212. The first position shown in FIG. 2A is suitably a shape set or shape memory curved or V-shaped configuration of the strip.

In embodiments, a change in temperature occurs as the result of a transfer of thermal energy from user 102 to a first thermal energy source/sink 212, caused by the user's contact, or sufficiently close interaction, with haptic feedback generator 106A or substrate 110 or other portion of device 104. In exemplary embodiments, haptic feedback generator 106A can comprise two thermal energy sources/sinks 210, 212 as shown, for instance, in FIGS. 2A and 2B. Additional thermal energy sources/sinks can also be utilized. Transfer of thermal energy from user 102 to, for example, thermal energy source/sink 212, increases the temperature of the thermal energy source/sink 212, which in turn increases the temperature of bilayer material strip 202, as described herein.

Heat transfer between user 102 and thermal energy source/sink 212 can occur by a user's contact with thermal energy source/sink 210 (or other portion of device 104 including substrate 110), which can then transfer heat to thermal energy source/sink 212. The increase in temperature of bilayer material strip 202 results from the direct physical interaction (including conduction via contact) between bilayer material strip 202 and thermal energy source/sink 212. As described herein, the increase in temperature causes the bilayer material strip 202 to deflect from a first position (FIG. 2A) to a second position (FIG. 2B), as a result of the higher CTE material (layer 204) heating more rapidly than layer 206, which results in a force effect, thermal stress, thermal bowing, or torque in the material, and a deflection from the first position to the second position.

The increase in temperature can also result from heat from thermal energy source/sink 210 transferring to bilayer material strip 202, simply by heating of surrounding air (e/g. convection) or other elements of the haptic feedback generator 106A. In embodiments, heating of thermal energy source/sink 210 caused by user 102 contact can transfer heat to thermal energy source/sink 212 by conduction (from one thermal energy source/sink to the other), thereby ultimately providing thermal energy source/sink 212 with sufficient heat to increase the temperature of bilayer material strip 202, and cause the deflection.

As used herein a "thermal energy source/sink" refers to a material that is able to absorb and transfer heat, either as a source of heat (conducting heat to another material), or as a sink for heat (removing or dissipating heat from another material). In embodiments, the thermal energy sources/sinks for use in the systems described herein can act as both a source and a sink, depending on the configuration and design of the systems.

In embodiments, deflection of bilayer material strip 202 to its second position as shown in FIG. 2B causes a surface of the deflected haptic feedback generator 106B to contact the user, or be directed toward the user, such as shown in FIG. 1B. In embodiments, deflected haptic feedback generator 106B may bow to protrude above or beyond the surface of device 100. In other embodiments, deflected haptic feedback generator can move substrate 110, which can be a touchpad surface, a touch screen, or a glass or plastic cover, etc., toward user 102.

In additional embodiments, the change in temperature can further comprise a decrease in temperature of the bilayer material strip. This change in temperature can occur due to a transfer of thermal energy from bilayer material strip 202 to a thermal energy source/sink (e.g., 210), as a result of removal of the user's 102 contact with the deflected haptic feedback generator 106B. That is, when user 102 removes the contact from the deflected haptic feedback generator 106B, thermal energy source/sink 210 cools via passive diffusion of heat from thermal energy source/sink 210, allowing thermal energy from bilayer material strip 202 to transfer to thermal energy source/sink 210, which in turn decreases the temperature, or cools, bilayer material strip 202.

By optimizing the thickness and material selection for bilayer material strip 202, as described herein, this cooling can be rapid enough such that the temperature reduction of the bilayer material strip 202 causes the bilayer material strip 202 to deflect from the second position (FIG. 2B) back to the first position (FIG. 2A), or stated another way causes the bilayer material strip 202 to return or relax to its shape set or shape memory first position (FIG. 2A) from the second position (FIG. 2B). This process of heating, deflection, cooling, and return deflection, can be repeated as often as desired or required by a particular application. Such embodiments which rely on the use of thermal energy from a user to heat (and ultimately cool) thermal sources/sinks are termed "passive" thermal processes or "passive" changes in temperature herein.

In a further embodiment, bilayer material strip 202 can transfer thermal energy to an actively cooled thermal energy source/sink (e.g., 210), wherein the thermal energy source/sink (e.g., 210) may provide active cooling when triggered by, or in response to, the removal (or cessation) of a user's contact with the haptic feedback generator. In such embodiments, due to the active cooling the temperature of the bilayer material strip 202 decreases, causing the strip to deflect from the second position back to the first position. As illustrated in FIGS. 2A-2B, in such embodiments, bilayer material strip 202 begins in a first position in FIG. 2A. Following heating as a result of energy transfer from user 102, bilayer material strip 202 deflects to a second position, as shown in FIG. 2B. When the user 102 ceases contact with the haptic feedback generator (now deflected haptic feedback generator 106B), this triggers the cooling of thermal energy source/sink 210, for example via various active methods described herein (e.g., fans, liquid channels or tubes, etc.). Thermal energy can then transfer from bilayer material strip 202 to thermal energy source/sink 210, resulting in a decrease in the temperature of the strip. This thermal energy transfer causes the strip to deflect back to the first position, as the higher CTE of the upper or first layer 204 results in a faster cooling, and allows for the return to the initial curved configuration of bilayer material strip 202 in FIG. 2A. As described for other process herein, this process of heating, deflection, cooling, and return deflection, can be repeated as often as desired by a particular application.

Figure 4:
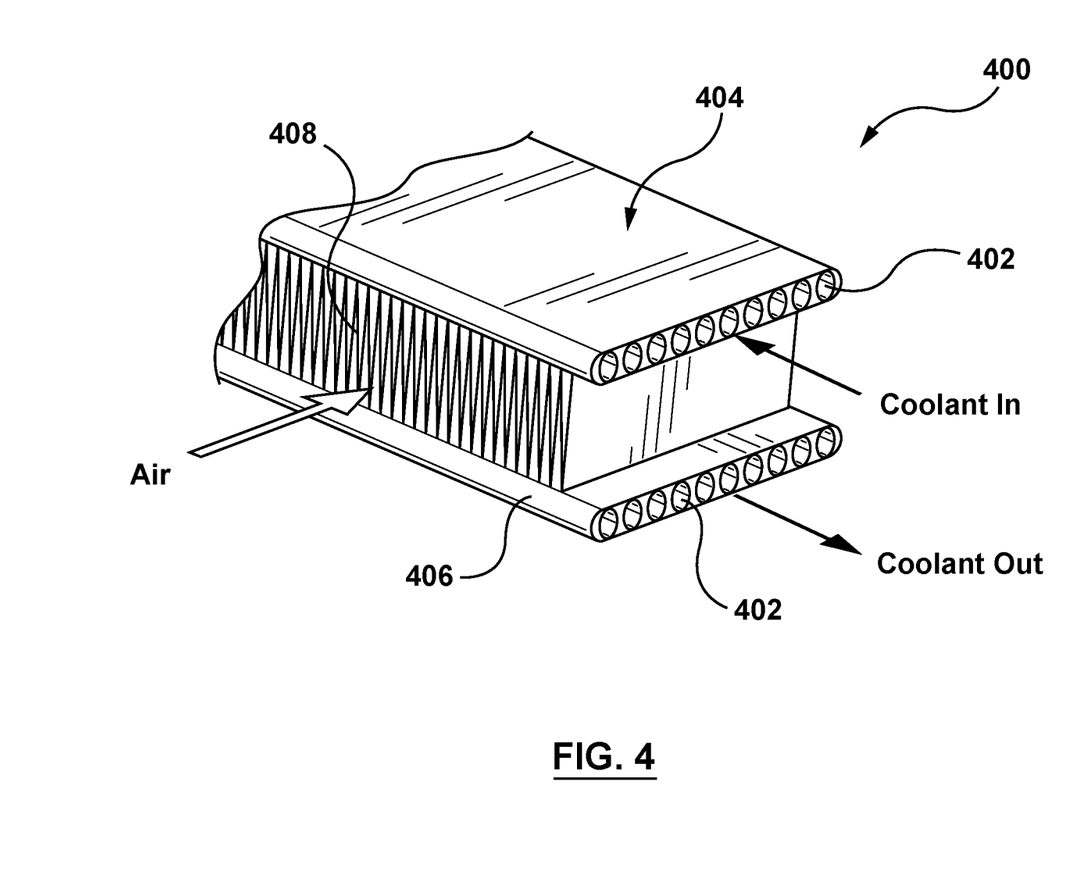
FIG. 4 is an illustration of a thermal energy source/sink comprising fluid channels in accordance with an embodiment hereof.
Figure 5:
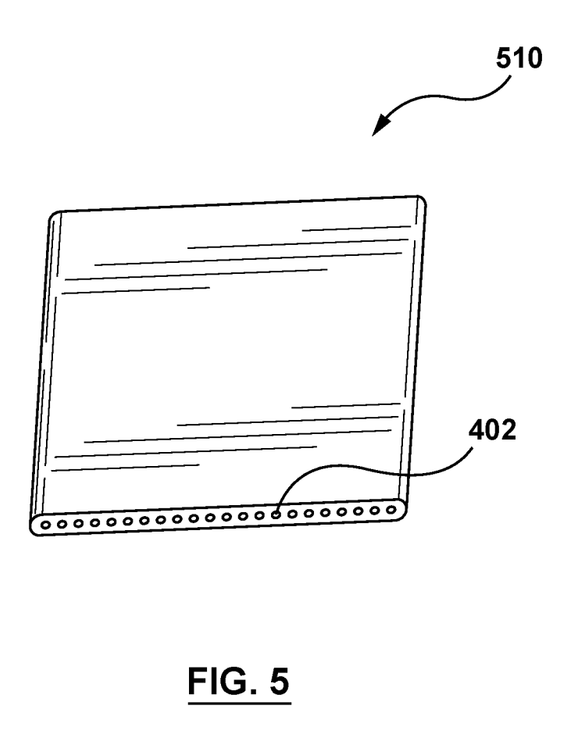
FIG. 5 is an illustration of a thermal energy source/sink comprising fluid channels in accordance with a further embodiment hereof.

Methods of cooling thermal energy source/sinks (e.g., 210 and if desired 212), include the use of fans, water or other liquids, or other methods of rapidly dissipating heat. In exemplary embodiments, as shown in FIGS. 4 and 5 and as described herein in further detail, thermal energy sources/sinks can comprise fluid channels which allow circulation of fluids to aid in cooling (heat dissipation) of thermal energy sinks, and can also be used to provide thermal energy sources (heating) in other embodiments. The fluid channels may provide one or more passages for a liquid cooling media, or cooling liquid, to pass through, wherein the liquid cooling media is circulated through a heat exchanger thermally isolated from the haptic feedback generator. Heat is removed from the liquid, and then the liquid is re-circulated to continue to remove heat from the thermal energy source/sink that is in contact with bilayer strip 202. In another embodiment, a dual piezoelectric cooler can also be used to aid in cooling of the thermal energy sources/sinks. Such piezoelectric coolers generally rely on a bellowing action to emit pulses of air across a heat source. The action is driven by a piezoelectric actuator with the device to push air out and create a turbulent flow that entrains ambient air to create a jet-like stream and increase heat transfer. See for example, AAVID Thermalloy's "Dual Cool Jets," low profile air movers (San Jose, Calif.).

Additional embodiments which do not rely on the use of thermal energy from a user contact to heat (or a user ceasing contact to cool) thermal sources/sinks are termed "active" thermal processes herein, and utilize one or more heating elements or sources, and/or cooling mechanisms, to change the temperature of a thermal energy source/sink and thus change the temperature of bilayer material strip 202.

For example, an increase in temperature of the bilayer material strip can be triggered when user 102 makes contact with haptic feedback generator 106A (or substrate 100). This contact can trigger a heating of a thermal energy source/sink (e.g., 212), which in turn increases the temperature of bilayer material strip 202 as it is in contact with thermal energy source/sink 212. The increase in temperature causes the bilayer material strip to deflect from the first position (FIG. 2A) to the second position (FIG. 2B) once a particular temperature/stress is reached in the strip, which results in haptic feedback to user 102. In such embodiments, the user's 102 contact serves simply as a signal to system 100 to trigger, or initiate, heating of a thermal energy source/sink (e.g., 212). Thus, it is not heat transfer from a user's touch that is used to raise the temperature of bilayer material strip 202, but simply the fact that a user is touching haptic feedback generator 106A (or substrate 110 or other portion of device 100), which then causes the thermal energy source/sink to be heated and thus increase in temperature. This ultimately heats bilayer material strip 202, and causes the deflection from the first position (FIG. 2A) to the second position (FIG. 2B).

As described herein, methods for heating thermal energy source/sink 210 and 212 include various conductive methods, such as the use of electric heating elements, frictional heating elements, vibrational heating elements, and other methods of heating a thermal energy source as are known in the art. Heating of thermal energy source/sinks 210 and 212 can occur via any suitable method, including convention heating, conduction heating or radiation heating. Such methods can also be used to transfer heat from the energy source/sinks to the bilayer material strips so as to case the changes in temperature described herein.

In embodiments, thermal energy is transferred to a second thermal energy source/sink (e.g. 210), when user 102 ceases contact with deflected haptic feedback generator 106B. In embodiments, as described herein, thermal energy source/sink 210 can be cooled via various methods describe herein, allowing thermal energy to transfer from bilayer material strip 202 to thermal energy source/sink 210. This results in cooling of the strip, and causes the strip to deflect back to the first position. As described herein, this process of heating, deflection, cooling, and return deflection, can be repeated as often as desired by a particular application.

Both the active and passive changes in temperature and the related thermal processes described herein can suitably cause bilayer material strip 202 to oscillate in a cavity 214, such as a cavity of a device 104, between a first thermal energy source/sink (e.g., 212) and a second thermal energy source/sink (e.g., 210). As described herein, the oscillation suitably occurs with bilayer material strip 202 attached at opposing ends 214 and 216 using, for example, various adhesives or glues, rubber attachment points, or mechanical pivots, axes or other connection elements that allow bilayer material strip to pivot or deflect from the first position and the second position, including allowing for oscillation and vibration, without becoming detached from haptic feedback generator 106A.

The oscillation of bilayer material strip 202 creates a vibrational haptic feedback in a localized surface area (e.g., haptic feedback shown as 108) providing feedback to user 102 confirming contact with haptic feedback generator 106A. As described herein, in embodiments where an oscillation occurs, the frequency of oscillation of bilayer material strip 202 can be on the order of 1 Hz to about 1000 Hz, and suitably about 1 Hz to about 100 Hz, or the order of 10-100 Hz, 10-50 Hz, or about 10-20 Hz.

In exemplary embodiments, the thermal energy sources/sinks (e.g., 210/212) utilized to transfer heat to/from bilayer material strip 202 suitably comprise a porous material. The use of a porous material allows for rapid heating and cooling, as desired, of the thermal energy sources/sinks.

In still further embodiments, at least one material (i.e., one of first layer 204 or second layer 206, and suitably both) of bilayer material strip 202 is porous. As with thermal energy sources/sinks, making the bilayer material strip using a porous material aids in the ability to rapidly heat and cool the strip, so as to allow for faster deflection in systems 100 described herein. Suitably, the porosity of the materials reduces the thermal mass of the materials by at least about 15% below the thermal mass of the corresponding material having the same geometric shape, if that material was nonporous. In embodiments, the thermal mass is reduced by at least about 20%, or at least about 30%, at least about 40%, or at least about 50% below the thermal mass of a corresponding, nonporous material, having the same geometric shape.

Figure 2C:
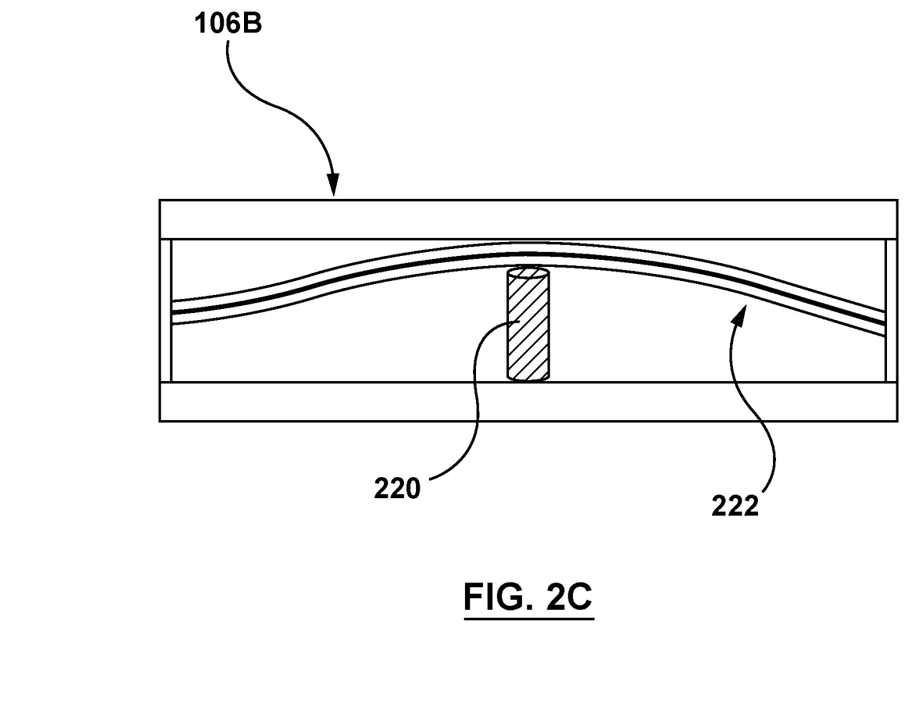

In embodiments described herein, including where the change in temperature is provided by active or passive heating, systems 100 can further comprise a spring (including a lever, or other compressible or stretchable element) coupled to either the top surface of bottom surface of bilayer material strip 202. FIG. 2C shows an orientation where spring 220 can be attached to bottom surface 222 of bilayer material strip 202. The spring is either mechanically elongated or mechanically compressed (FIG. 2C), during deflection of the strip, and then returns bilayer material strip 202 to the first position upon the user ceasing contact with the haptic feedback generator 106A (suitably deflected user touchable haptic feedback generator 106B), see FIG. 2A. Spring 220 is a mechanical spring or lever, and is generally not activated by heating or cooling of the spring, but simply the extension or compression that causes the spring to return to its original shape and orientation.

In still further embodiments, user 102 may directly contact bilayer material strip 202, resulting in direct heat transfer from user 102 to the strip, or from the strip to the user, heating (or cooling) the strip and causing a deflection from a first position to a second position. As described herein, depending on the coefficient of thermal expansion of first layer 204 and second layer 206 forming bilayer material strip 202, contact between user 102 (i.e., user's finger) and for example first layer 204 of bilayer material strip 202 can act as a heat source or a heat sink to increase or reduce the differential stress in the bilayer material strip as the bilayer material strip is warmed to the skin temperature (approximately 34° C.) of the user. Exemplary materials for bilayer material strip 202 can be selected so as to have relative and absolute coefficients of thermal expansion that operate best at temperatures around 30-40° C. Thus, contact between user 102 and bilayer strip 202 will transfer thermal energy to cause the temperature of the bilayer material strip to rise and thereby provide haptic feedback to the user. In such embodiments, it is not necessary to utilize separate thermal energy sources/sinks to provide the change in temperature for bilayer material strip, as all of the heating and cooling is suitably carried out simply via heat transfer between the user and the strip materials.

As described herein, it is advantageous to utilize ultra-thin bilayer materials (suitably bimetal) strips in the various systems 100. Exemplary materials include layers of Al and silica ($SiO_2$), or layers of silica and poly(vinylidene fluoride) (PVDF), which can have a total strip thickness in the range of dimensions suitable for bimetallic oscillators (e.g., 1-100 µm). In other instances multiple thin strips can be arranged in parallel or stacked configuration to create bilayer material strip 202 having two distinct layers or sections of materials having different thermal and material characteristics.

In embodiments, bilayer material strip 202 includes two different material layers or sections, the materials having different coefficients of thermal expansion, i.e., (low and high) values. One example is the combination of two alloy metals (i.e. bimetal material); B72M (Mn Cu 18 Ni 10) with a CTE=26.4×10-6/° K. and INVAR® (Fe Ni) with CTE=2× 10-6/° K. Additional exemplary bilayer materials, as well as bimetals include, but are not limited to, N42 (Fe Ni 42), NC4 (Fe Ni 23 Cr 3), B6M (Fe Ni 21 Mn 6); Al (CTE=0.25× 10-5/° K) and silicon (CTE=2.6×10-6/K); PVDF (CTE=122×10-6/K) and $SiO_2$ (CTE=0.4×10-6/K); PVDF (CTE=122×10-6/K) and Al (CTE=0.25×10-6/K); and PVDF and polyimide (CTE=3×10-6/K).

In additional embodiments, a single layer, or bilayer, of a metal can be combined with materials such as shape memory alloys (SMA) or shape memory polymers (SMP) to create a high-performance actuator. The shape change resulting from the change in temperature of the metal material, combined with the actuation resulting from the actuation of a SMA or SMP can result in synergistic effect, where the actuation is magnified or amplified. Such materials can be prepared in multiple layered structures and utilized in the various embodiments and applications discussed herein.

Processing and manufacturing of bilayer material strip 202 as described herein includes for example, processing the strip materials to be used to make the bilayer strip, such as a bimetal alloy, by a rolling or a plating process to bond the two metal layers together. In the case when using aluminum (Al) and silicon, thermal evaporation (sputtering method) (PVD) can be used to fabricate the material. For instance, thin film Al can be sputtered onto a thin section of a Silicon material. A thin oxide layer (such as $Al_2O_3$ or $SiO_2$) can be formed between the Al and silicon material layers to provide electrical protection (for the purpose of this description, such a structure would still be considered to be a bilayer material in accordance with the description herein). For example, when using PVDF and Al, first a thin film of PVDF material can be deposited using film casting methods (spin coating, solvent evaporation). In a next step, a thin layer of Al can be deposited onto one side of PVDF material strip. When using other material combinations such as PVDF/polyimide, a simple bonding mechanism or plasma enhanced adhesion methods can be employed to enhance the adhesion between the two materials. Moreover, a thin metal material layer can be laminated between two polymer layers in order to be used later as a (resistive) heating element (source).

The methods and systems described herein are designed to operate under conditions in which heat transfer occurs very quickly, resulting in a very fast system response time (strip snapping). The very thin dimension of the bilayer material strips 202 translates to a very low thermal mass, so that strip heating and cooling can occur very quickly. The rate of cooling is limited by the rate of thermal conduction (heat transfer through conductive heat transfer) of the bilayer material strip 202. Thermal energy is suitably removed from the surface of the bilayer material strip 202, and thus utilizing a thin bilayer material strip 202 minimizes the amount of thermal energy that can be retained, aiding in rapid heating/cooling and rapid deflection.

As described herein, whether using a passive or an active temperature change of the bilayer material strip, cooling elements such as those shown in FIGS. 4 and 5 can be implemented. FIG. 4 shows a micro channel heat exchanger 400 where micro channels 402 in a top section 404 of a thermal energy source/sink receive coolant and guide the coolant fluid to the micro channels 402 of the lower section 406 as the space between the top and bottom section has heat transfer fins 408 in a corrugated pattern extending between them as is well known in radiator technologies to provide a large surface area to which the air flowing sideways (see arrow) through the fins can be exposed. As described herein, use of such a cooling mechanism provides for rapid thermal transfer from bilayer material layer 202 to thermal energy source/sink (e.g., 210), to allow for quick deflection and return deflection of bilayer material layer 202. A similar micro channel system can also be used to heat a thermal energy source/sink, when required, as described herein, for example through the use of a heated liquid. FIG. 5 shows a similar embodiment of a microchannel heat exchanger 510, where only a single set of micro channels 402 are utilized.

Figure 8A:
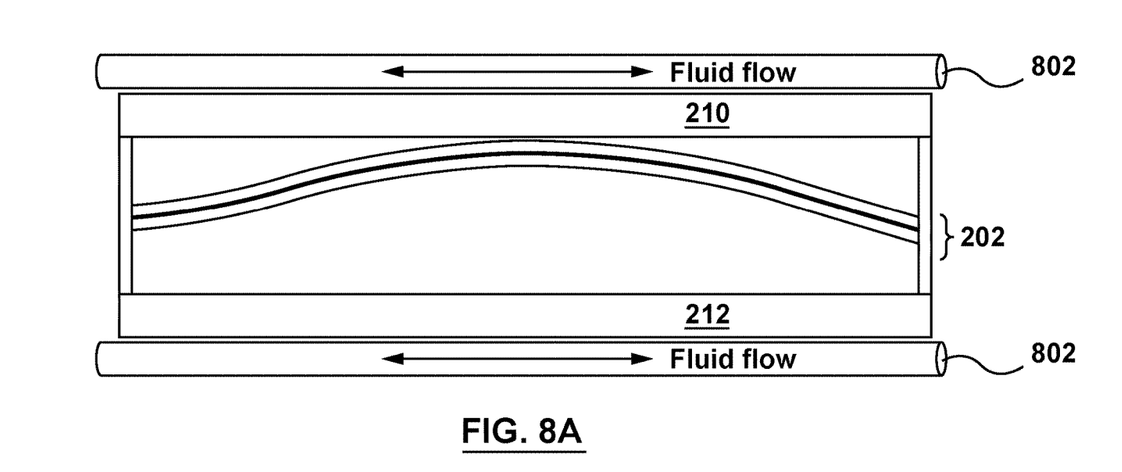
FIGS. 8A-8B are sectional views of a haptic feedback generator in accordance with an embodiment hereof.
Figure 8B:
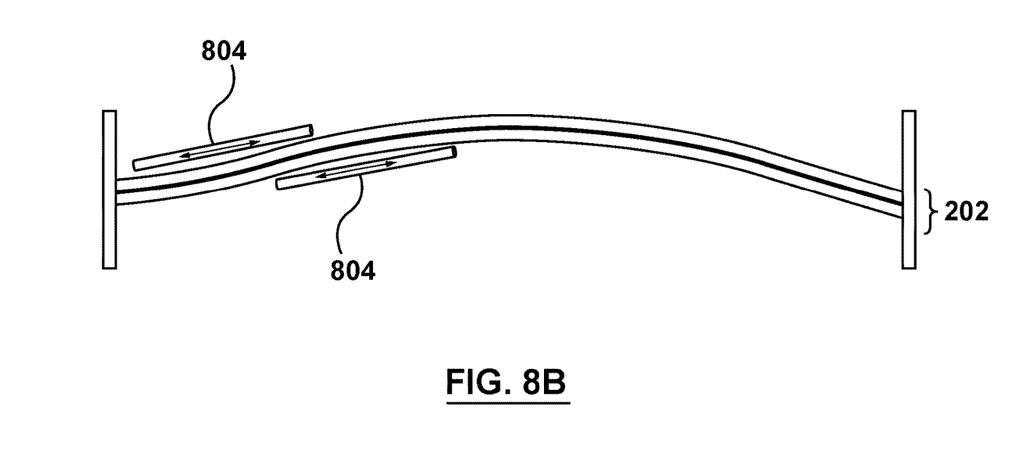

In addition to micro channels through thermal energy sources/sinks, fluid in channels 802 can also be passed above or below thermal energy sources/sinks (e.g., 210/212) to control temperature (see FIG. 8A). In other embodiments, fluid can be passed above or below bilayer material strip 202 in flexible tubes or channels 804, without the need for additional elements acting as thermal energy sources/sinks (e.g., 210/212) (see FIG. 8B). While flexible tubes or channels 804 are shown extending only over and above a partial section of bilayer material strip 202, it should be understood that tubes or channels 804 suitably can extend over the entire length of the bilayer material strip 202.

In still further embodiments, cooling or heating elements, such as electronic heating elements, or fluid channels, can be added directly to bilayer material strip 202, including for example by passing fluid channels or tubes 806 through a porous material of the first and second layers 204, 206, to utilize the strips not only as deflecting elements, but also as self-heating and self-cooling elements. See FIG. 9. Single or multiple channels or tubes 806 can be used as required to properly control the temperature of bilayer material strip 202. In embodiments, tubes 806 can be made from flexible materials to allow for the deflection and movement that occurs with bilayer material strip 202.

Figure 9:
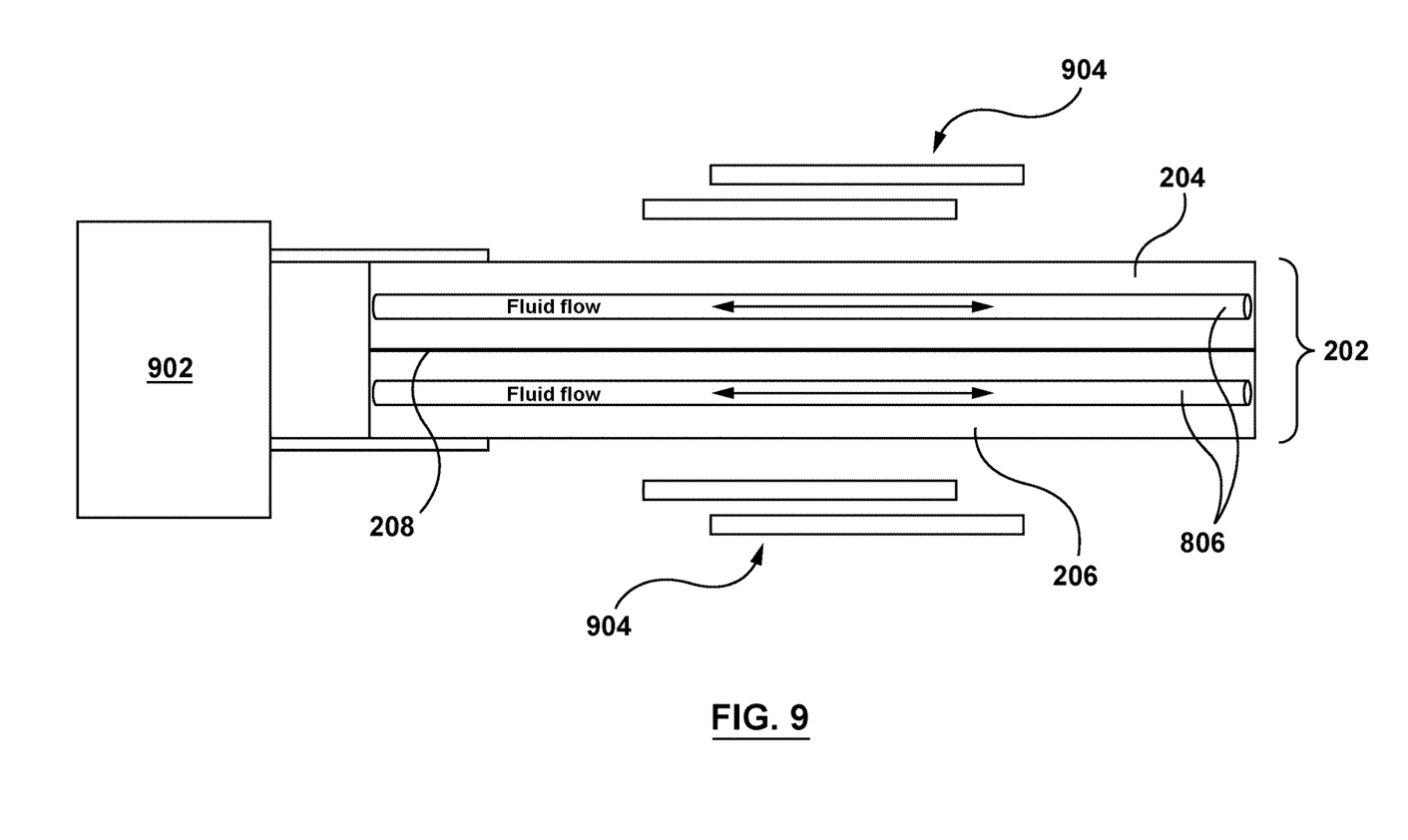
FIG. 9 is a sectional view of a bilayer material strip in accordance with an embodiment hereof.

In other embodiments, system 100 can comprise a dual piezoelectric cooler to act as a low power active cooling air mover (see cooler 902 of FIG. 9). In another instance, a set of opposed plates can be charged to provide ionic charging of air molecules which when they move, influence the air molecules adjacent to the ionized molecule to move as well to induce air motion for enhanced cooling (see set of plates 904 of FIG. 9).

The transition temperature and temperature difference for bilayer materials is suitably as low as possible. For example, bilayer material strip 202 is configured to deflect or "snap" at a temperature between about 30° C. and 47° C. Bilayer materials are suitably selected and configured (programmed) to work under a variety of desired temperatures and temperature differences.

The ultrathin systems as described herein can be implemented on many devices (wearable, mobile, gaming, mobile phones, touchpads etc.) to provide haptic feedback and require minimal energy (from user's body heat or external heating devices).

The time lapse between application of a user's finger to substrate 110 or haptic feedback generator 106A of system 100 and the user detecting haptic feedback in response is called the response time of the system. The response time of the system is dependent on the materials chosen to make up the bilayer material strip, and the physical configuration as described herein. In addition, the response time of a particular system is dependent on the thermal mass and rate of heat transfer between the hot and cold thermal sources/sinks and the materials of the bilayer material strip. Suitably, the response time of the systems described herein are on the order milliseconds (i.e., 1-100 milliseconds).

In embodiments, the following parameters are taken into consideration to improve the response time (performance) of the systems:
- use of porous materials (e.g., porous Si, PVDF, AL, etc.) to minimize the thermal mass of each layer of the bilayer material strip to achieve better performance (an improved response time);
- use of very thin (micron size) but strong materials;
- use of thin cooling devices such as dual piezoelectric coolers to maximize cooling;
- modification of bilayer material strip 202 from two to three or more layers to improve conductive heat transfer within and between material layers;
- configuring of bilayer material strip 202 in a sealed (or closed cooled) system that may include use of a thermal transfer fluid in contact with an outer or inner cooling passage surface of the respective components to improve the rate of heat transfer between system components having different temperatures as the actuation process is initiated and progresses.

The haptic feedback process can also be accelerated by configuring the bilayer material strip 202 between two thermal energy source/sinks, i.e., heating sources (or thermal heat sinks) to accelerate the heating of the bilayer material strip. For instance, the top surface of the bilayer material strip can be exposed to a thermal mass having a temperature T1 (cold source) and the bottom surface of the bilayer strip can be configured to thermally connect with a second thermal mass having a temperature T2 (hot source) (see FIGS. 2A and 2B). The higher CTE material in the bilayer material strip being on top, facing the cold source inside the actuator system where the bimetal strip moves.

When using such a system configuration, the initial activation time and the subsequent rate at which the haptic feedback generator vibrates or deforms depends on the rate of thermal energy transfer from the thermal energy sources/sinks (hot and cold) to the bilayer material strip 202 and associated temperature fall and rise of both layers in the bilayer material strip, the CTEs (coefficients of thermal expansion) of the two materials making up the bilayer strip, and their ambient temperature geometry (configuration), as set during system assembly.

Figure 6:
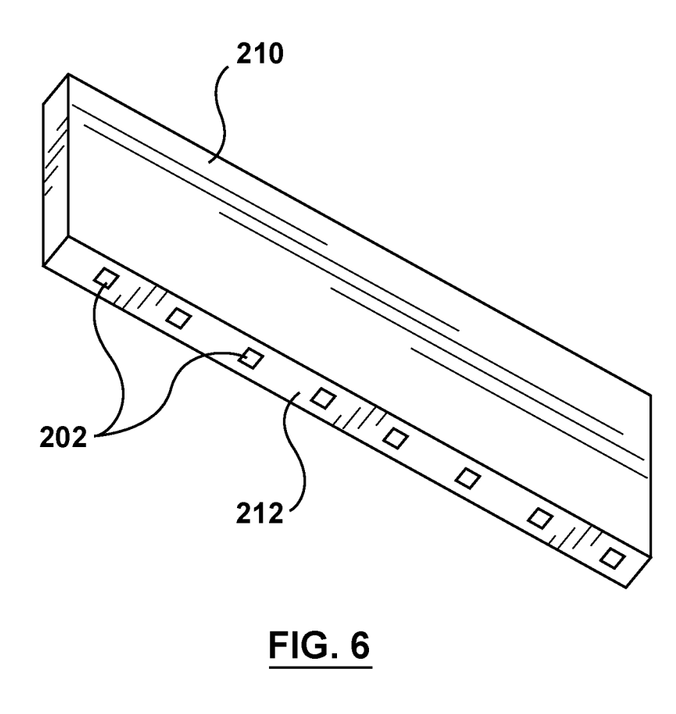
FIG. 6 is an illustration of a system for providing haptic feedback to a user, comprising multiple bilayer material strips, in accordance with an embodiment hereof.
Figure 7:
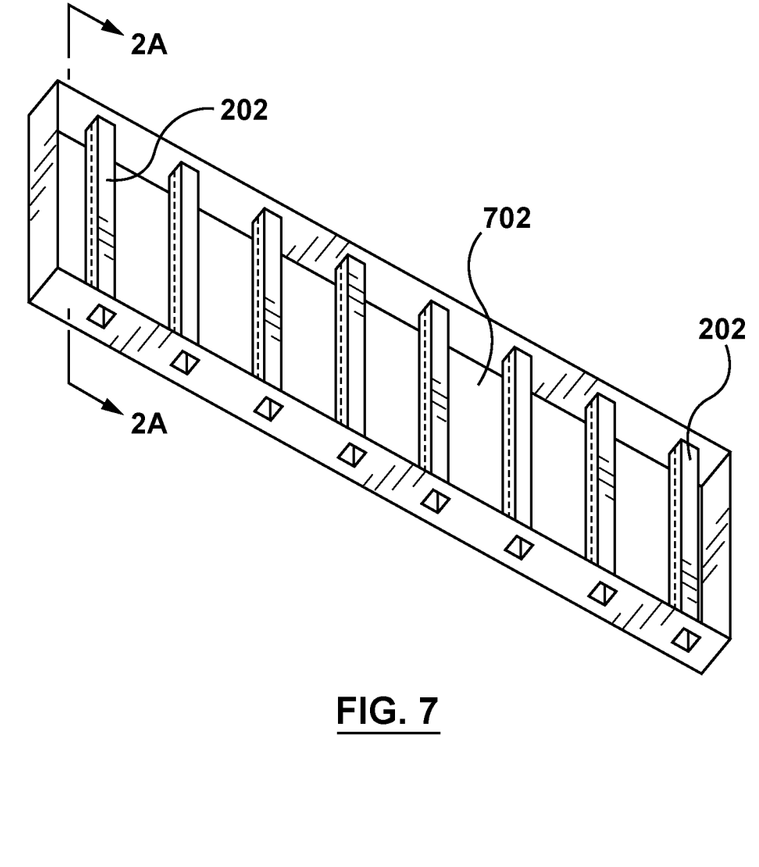
FIG. 7 is a cutaway illustration of a system for providing haptic feedback to a user, comprising multiple bilayer material strips, in accordance with an embodiment hereof.

FIGS. 6 and 7 show an alternate arrangement of a haptic feedback generator as described herein. With reference to FIG. 6, a plurality of bilayer material strips 202 are shown assembled in a parallel configuration in a cavity 702 (see FIG. 7) of the haptic feedback generator, and are also shown disposed between two thermal energy sources/sinks (210/212), e.g., a hot source on first sides of the plurality of strips and a cold source on second sides of the plurality of strips.

FIG. 7 shows a cutaway view where thermal energy sources/sinks 210/212 of the haptic feedback generator have been removed and bilayer material strips 202 are pictured. FIG. 2 provides a sectional view of an exemplary bilayer material strip 202 of the plurality of bilayer material strips shown in the embodiment of FIGS. 6 and 7. The bilayer material strips as shown are ultrathin strips (straight or having some curvature) made, as described herein, of two different materials with two different coefficients of thermal expansion. They are arranged in a parallel configuration. Any number of bilayer material strips can be used, suitably 2 or more, more suitably about 2 to about 100 bilayer material strips, or about 10 to about 100, about 20 to about 100, about 20 to about 50, or about 10, about 20, about 30, about 40, about 50, about 60, about 70, about 80, about 90 or about 100 bilayer material strips. The bilayer material strips may have similar or varying thicknesses, suitably in the range of about 10 μm to 100 μm.

Also provided herein are methods of generating haptic feedback in a haptic feedback generator system in response to a user's contact with the haptic feedback generator system. In embodiments, such methods comprise increasing the temperature of a first thermal energy source/sink in the haptic feedback generator system, thereby increasing the temperature of a bilayer material strip in the system. The methods further comprise deflecting the bilayer material strip between a first position and a second position to generate haptic feedback to the user.

As described herein, in embodiments, increasing the temperature of the first thermal energy source/sink involves transferring thermal energy from the user to the first thermal energy source/sink as a result of the user's contact with the haptic feedback generator system (i.e., a passive temperature change as described herein). In further embodiments, increasing the temperature of the first thermal energy source/sink utilizes heating the first thermal energy source/sink, triggered by the user's contact with the haptic feedback generator (i.e., an active temperature change as described herein).

In further embodiments, the methods further include transferring thermal energy from the bilayer material strip to a second energy source/sink, when the user ceases contact with the haptic feedback generator, and deflecting the bilayer material strip from the second position to the first position. In still further embodiments, thermal energy is transferred from the bilayer material strip to a second thermal energy source/sink, when the user ceases contact with the haptic feedback generator, and deflecting the bilayer material strip from the second position to the first position.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system for providing haptic feedback to a user, the system comprising:
    a device having a haptic feedback generator, wherein the haptic feedback generator includes:
        a bilayer material strip comprising at least a first material and a second material that have different coefficients of thermal expansion,
        wherein the haptic feedback generator further includes a first energy source/sink,
        wherein in response to a change in temperature, the bilayer material strip is configured to deflect between a first position and a second position to provide haptic feedback to the user,
        wherein the change in temperature is an increase in temperature of the bilayer material strip that occurs due to a transfer of thermal energy from the user to the first thermal energy source/sink, when the user makes contact with the haptic feedback generator, wherein the increase in temperature causes the bilayer material strip to deflect from the first position to the second position.

2. The system for providing haptic feedback of claim 1, wherein the bilayer material strip is a bimetallic strip.

3. The system for providing haptic feedback of claim 2, wherein the bimetallic strip has one of a curve profile and a V-shaped profile.

4. The system for providing haptic feedback of claim 1, wherein the bilayer material strip has a thickness on the order of about 1 μm to about 200 μm.

5. The system for providing haptic feedback of claim 1, wherein the haptic feedback generator further comprises a second energy source/sink, and wherein the change in temperature is a decrease in temperature of the bilayer material strip that occurs due to a transfer of thermal energy from the bilayer material strip to the second energy source/sink when the user ceases contact with the haptic feedback generator, wherein the decrease in temperature causes the bilayer material strip to deflect from the second position to the first position.

6. The system for providing haptic feedback of claim 1, wherein the bilayer material strip deflects from the first position to the second position in a direction toward the user.

7. The system for providing haptic feedback of claim 1, wherein the haptic feedback is a vibrational haptic feedback effect created by oscillation of the bilayer material strip.

8. The system for providing haptic feedback of claim 1, wherein the first thermal energy source/sink comprises a porous material.

9. The system for providing haptic feedback of claim 1, wherein the first thermal energy source/sink comprises fluid channels.

10. The system for providing haptic feedback of claim 1, wherein a bottom surface of the bilayer material strip is coupled to a spring that returns the bilayer material strip to the first position upon removal of the user's contact with the haptic feedback generator.

11. The system for providing haptic feedback of claim 1, wherein at least one material of the bilayer material is porous.

12. A method of generating haptic feedback in a haptic feedback generator system in response to a user's contact with the haptic feedback generator system comprising:
increasing the temperature of a first thermal energy source/sink in the haptic feedback generator system by transferring thermal energy from the user to the first thermal energy source/sink as a result of the user's contact with the haptic feedback generator, thereby increasing the temperature of a bilayer material strip in the system; and
deflecting the bilayer material strip between a first position and a second position to generate haptic feedback to the user.

13. The method of claim 12, further comprising transferring thermal energy from the bilayer material strip to a second energy source/sink, when the user ceases contact with the haptic feedback generator, and deflecting the bilayer material strip from the second position to the first position.

* * * * *